US007032759B2

(12) United States Patent
Reinach et al.

(10) Patent No.: US 7,032,759 B2

(45) Date of Patent: *Apr. 25, 2006

(54) PUSHER CENTRIFUGE

(75) Inventors: Harald Reinach, Remetschwiel (DE); Roy Geiger, Schafisheim (CH)

(73) Assignee: Ferrum AG, Rupperswil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/819,042

(22) Filed: Apr. 5, 2004

(65) Prior Publication Data

US 2004/0206688 A1 Oct. 21, 2004

(30) Foreign Application Priority Data

Apr. 16, 2003 (EP) ................................. 03405275

(51) Int. Cl.
*B01D 33/46* (2006.01)
*B01D 33/06* (2006.01)
*B04B 3/02* (2006.01)

(52) U.S. Cl. ...................... 210/369; 210/372; 210/376; 210/489; 464/36

(58) Field of Classification Search ................ 210/359, 210/360.2, 369, 372, 373, 376, 488, 489; 494/36

See application file for complete search history.

(56) References Cited

U.S. PATENT DOCUMENTS 3,092,580 A * 6/1963 Irving ........................ 210/376
3,395,807 A * 8/1968 Fierstine ..................... 210/376
3,463,316 A 8/1969 Flerstine
5,356,366 A * 10/1994 Stahl ........................... 494/37
2002/0030024 A1* 3/2002 Leung et al. ............... 210/781
2004/0185999 A1* 9/2004 Beyer et al. .................. 494/53

FOREIGN PATENT DOCUMENTS

DE 689951 C 4/1940
DE 1065333 B 9/1959
GB 1518239 A 7/1978

* cited by examiner

*Primary Examiner*—Fred G. Prince
(74) *Attorney, Agent, or Firm*—Townsend and Townsend and Crew LLP

(57) ABSTRACT

The invention relates to a pusher centrifuge (1) for the separation of a mixture (2) into a solid cake (3) and into a liquid phase (4). The pusher centrifuge (1) in accordance with the invention includes an outer screen drum (6) rotatable about an axis of rotation (5), a mixture distributor (7) arranged in the screen drum (6) with a pusher base apparatus (8) and an infeed device (9), with the pusher base apparatus (8) being arranged and designed such that the solid cake (3) is displaceable by means of the pusher base apparatus (8) and the mixture (2) can be introduced by the infeed device (9) via the mixture distributor (7) into an empty space (R) which arises on the displacement of the solid cake (3) by the pusher base apparatus (8). The mixture distributor (7) includes at least one funnel (10) for the pre-acceleration of the mixture (2), with the funnel (10) being rotatably arranged about a drive axis (11) and being rotatable at a pre-settable speed of rotation about the drive axis (11) by means of a drive (12).

19 Claims, 10 Drawing Sheets

PUSHER CENTRIFUGE

BACKGROUND OF THE INVENTION

The invention relates to a pusher centrifuge for the separation of a mixture into a solid cake and into a liquid phase, including an outer screen drum rotatable about an axis of rotation, a mixture distributor arranged in the screen drum with a pusher base apparatus and an infeed device, with the pusher base apparatus being arranged and designed such that the solid cake is displaceable by means of the pusher base apparatus and the mixture can be introduced by the infeed device via the mixture distributor into an empty space which forms as the solid cake is displaced by the pusher base apparatus.

Centrifuges are widespread and are used in the most varied areas in the most varied embodiments for the drying of moist substances or of moist substance mixtures. Discontinuously operating centrifuges such as scraper centrifuges are thus preferably used, for example, for the drying of very pure pharmaceutical products, whereas continuously operating pusher centrifuges are advantageously used in particular when continuously large volumes of a solid/liquid mixture should be separated. Depending on requirements, single-stage or multi-stage pusher centrifuges as well as double pusher centrifuges are used.

In the different types of the last-named class of pusher centrifuges, a solid/liquid mixture, for example a suspension or a moist salt or salt mixture, is supplied via a mixture distributor through an inlet tube to a fast rotating drum which is designed as a filter screen such that the liquid phase is separated through the filter screen due to the acting centrifugal forces, whereas a solid cake is separated at the interior at the drum wall. A substantially disc-shaped pusher base with a synchronized co-rotation is arranged in the rotating drum, with either the pusher base or a screen stage oscillating at a specific amplitude in the axial direction in the drum such that some of the dried solid cake is pushed out at an end of the drum. On the movement of the pusher base in the opposite direction, a region of the drum adjoining the pusher base is released which can then be again loaded with a new mixture through the inlet tube and via the mixture distributor. Depending on the type used, throughput volumes in an order of magnitude of 100 tons per hour can be reached without problem with modern heavy-duty pusher centrifuges, with drum diameters of up to 1000 mm and more being quite normal and typical rotational frequencies of the drum of up to 2000 revolutions per minute and more being achieved, depending on the drum diameter. Due to the high centrifugal forces which occur, a larger drum diameter results in a smaller maximum rotational frequency of the drum. The operating parameters such as the rotational frequency of the drum, the volume of mixture supplied per time unit or also the drum temperature or the type of pusher centrifuge used also depend on the actual material to be dried, the liquid content, etc.

The pusher centrifuges known from the prior art are as a rule continuously operating filter centrifuges. Single-stage and multi-stage pusher centrifuges are known, with the multi-stage pusher centrifuge consisting of an outer screen drum and at least one screen stage which is arranged in the outer screen drum and is likewise designed as a screen drum. A plurality of screen stages can be arranged concentrically inside one another such that two-stage, three-stage and multi-stage pusher centrifuges can be realized, with all screen stages being driven very fast synchronously about a joint axis of rotation. In the operating state, a solid/liquid mixture to be separated continuously enters through a fixed-standing inlet tube into a mixture distributor which is arranged in the innermost screen stage and which likewise rotates co-synchronously and is uniformly distributed on the innermost screen stage over its whole screen periphery. The largest part of the liquid is already centrifuged off here and a solid cake is formed.

In a second-stage pusher centrifuge, the innermost stage, which is also termed a first stage, carries out an oscillation movement in the direction of the axis of rotation in addition to the rotational movement about the axis of rotation. This oscillatory movement is generated hydraulically via a pusher piston with a reversing mechanism. The solid cake is thereby pushed from the first stage to the second stage in ring sections, corresponding to the stroke length of the oscillation, and ultimately exits the pusher centrifuge via a discharge opening. In practice, the solid cake is continuously washed in the screen drum while feeding washing liquid onto the solid cake.

In contrast, a single-stage pusher centrifuge does not include any further screen stages except for the outer screen drum. The pusher base oscillates here for the transport of the solid cake in the screen drum and simultaneously co-rotates synchronously with the outer screen drum.

A known two-stage pusher centrifuge which works in accordance with the aforementioned principle is described in detail, for example, in DT 25 42 916 A1, whereas a known method for the operation of a pusher centrifuge, in particular of a single-stage pusher centrifuge, can be seen in particular from EP 0 466 751 B1. In two-stage and multi-stage pusher centrifuges, the first stage, i.e. the innermost screen stage, substantially serves for the pre-dewatering of the mixture as well as for the forming of a solid cake, whereas the outer screen drum mainly serves as a drying stage. Since a pre-dewatering is possible by means of the first screen stage, a much higher liquid absorption capacity is achieved with multi-stage pusher centrifuges than with single-stage pusher centrifuges so that mixtures with lower inlet concentrations, i.e. with a higher liquid content, can be processed. This advantage with respect to single-stage pusher centrifuges is at least partly compensated in that multi-stage pusher centrifuges are much more complex in their design so that they are also more expensive to service and to purchase.

For special areas of application, special versions, specifically also of two-stage and multi-stage pusher centrifuges, are known, in particular for highly abrasive centrifuge goods such as coal and raw phosphate, which require special abrasion protection measures such as abrasive-resistant screens. Special designs for intensive washing processes and for the carrying out of special washing methods such as counter-flow washing for nitro-cellulose are also known from the prior art. Gas-impermeable versions of single-stage and multi-stage pusher centrifuges are also used for operation under an inert gas atmosphere.

Although single-stage and multi-stage pusher centrifuges such as briefly outlined above have also been well known for special applications in the most varied variants for a long time, the known single-stage and multi-stage pusher centrifuges nevertheless show different serious disadvantages. Even if lower inlet concentrations, i.e. mixtures with an increased liquid content, can be processed better, for example, with the known multi-stage pusher centrifuges than with customary single-stage pusher centrifuges, the inlet concentration of the mixture to be processed may not have any desired low degree. I.e. when the share of liquid in the mixture is too high, for example amounts to 50% or 70% or 80% or even more than 90% liquid phase, the mixture must frequently be pre-condensed in more or less complex processes. With too high a liquid content, a uniform distribution of the mixture to be dried over the periphery of the screen drum is made increasingly difficult. This can result, on the one hand, in very damaging vibrations of the screen drum and thus to premature wear of bearings and the drive; in the worst case it can even lead to a safety problem in operation. On the other hand, a sold cake distributed unevenly over the periphery of the screen drum brings about problems in washing. Static condensers, arc screens or the very well known hydrocyclones are therefore available. It is obvious that the use of such pre-dewatering systems is very complex and thus expensive both from a process and an apparatus point of view.

A further serious disadvantage in the processing of mixtures of a smaller inlet concentration consists of practically the whole volume of liquid supplied with the mixture having to be accelerated to the full peripheral speed before it is separated through the filter screen of the screen drum. The same applies to very small particles in the mixture which should likewise be separated from the solid cake through the screen. This is extremely unfavorable energetically and has a clearly negative influence on the operating behavior of the centrifuge.

The disadvantages recited by way of example above and in the following mainly for multi-stage pusher centrifuges also apply, as a rule even in amplified form, to single-stage pusher centrifuges.

But even in the processing of mixtures with a much higher solid concentration, the pusher centrifuges of the prior art have some huge disadvantages. For instance, the mixtures introduced into the mixture distributor through the inlet tube is accelerated in a very short time up to the full peripheral speed of the drum on impacting the screen drum. This can result, among other things, in grain breakage, in particular with sensitive substances; that is, for example, solid grains which are distributed in a suspension supplied to the centrifuge burst into smaller pieces in an uncontrolled manner on the abrupt acceleration process, which can have negative influences on the quality of the solid cake produced when, for example, the particle size of the grains in the end product plays a role.

SUMMARY OF THE INVENTION

It is therefore an object of the present invention to provide an improved pusher centrifuge which largely avoids the disadvantages known from the prior art.

The invention thus relates to a pusher centrifuge for the separation of a mixture into a solid cake and into a liquid phase. The pusher centrifuge in accordance with the invention includes an outer screen drum rotatable about an axis of rotation, a mixture distributor arranged in the screen drum and having a pusher base apparatus and an infeed device, with the pusher base being arranged and designed such that the solid cake can be displaced using the pusher base apparatus and the mixture can be introduced into an empty space via the mixture distributor using the infeed device, the empty space arising when the solid cake is displaced by the pusher base apparatus. The mixture distributor includes at least one funnel for the pre-acceleration of the mixture, with the funnel being arranged rotatably about a drive axis and being rotatable about the drive axis by means of a drive with a pre-settable speed of revolution.

Single-stage and multi-stage centrifuges, as well as their functional principles, are known in the most varied embodiments from the prior art such that in the following only the features material to the invention have to be described in detail.

The pusher centrifuge in accordance with the invention serves for the separation of a mixture into a solid cake and into a liquid phase and includes as material components an outer screen drum which is rotatable about an axis of rotation via a drum axle and is accommodated in a housing. The pusher centrifuge in accordance with the invention can be designed as a single-stage centrifuge, as a second-stage centrifuge or as a centrifuge with more stages. The drum axle is actively connected in a manner known per se to a drum drive such that the outer screen drum can be set into fast rotation about the axis of rotation by the drum drive. With centrifuges having more stages, that is, with two-stage or multi-stage centrifuges, at least one further screen stage is arranged inside the outer screen drum. Furthermore, a mixture distributor having a pusher base apparatus is provided in the screen drum, with either the screen stage and/or the pusher base apparatus being arranged movably to and fro along the axis of rotation such that the solid cake is displaceable by means of the pusher base apparatus. Both the outer screen drum and—when present as with multi-stage pusher centrifuges—the further screen stage have screen openings through which liquid phase can be drained to the outside from the solid cake or from the mixture by the centrifugal forces which occur in a known manner at fast rotation, the mixture being applied, as will be described in more detail further below, onto an inner peripheral surface of the screen drum with single-stage pusher centrifuges or onto an inner screen stage surface of the screen stage with multi-stage pusher centrifuges.

In particular, in an example especially important for practice, the screen drum and/or the screen stage can be designed in a manner known per se as skeleton-like support drums which are lined with special filter foils at their peripheries to form the corresponding screen areas; i.e. the skeleton-like support drum can, for example, be made with one or more filter screens having filter openings of different or equal size for the separation of the liquid phase.

The mixture distributor having the pusher base apparatus and the infeed device is arranged inside the screen drum and allows mixture supplied continuously through the infeed device to be distributed onto the inner peripheral surface of the screen drum or, with multi-stage pusher centrifuges, onto the screen stage surface of the screen stage by being introduced into the empty space which arises on the displacement of the solid cake.

The pusher basis apparatus is formed at a peripheral region as a ring region such that the solid cake deposited in the screen drum with single-stage pusher centrifuges and deposited in the screen stage with multi-stage pusher centrifuges is displaceable with the ring region by an oscillation, described in more detail later, of the pusher base apparatus and/or of the screen stage from the screen drum with single-stage pusher centrifuges and into the screen drum or into a further screen stage possibly present with multi-stage pusher centrifuges.

It is important for the pusher centrifuge in accordance with the invention that the mixture distributor includes either a funnel formed as an inlet funnel for the pre-acceleration of the mixture which extends in a substantially divergent manner towards the pusher base apparatus, and/or a funnel designed as a pre-acceleration funnel for the pre-acceleration of the mixture which extends in a substantially divergent manner in the direction towards the infeed device, with the inlet funnel and/or the pre-acceleration funnel being rotatable at a pre-settable rotational speed about an axis of rotation by means of a drive. The inlet funnel and/or the pre-acceleration funnel is rotatable at a pre-settable speed about the drive axis for the controlled pre-acceleration of the introduced mixture independently of the speed of rotation of the outer screen drum.

Since, in contrast to the pusher centrifuges known from the prior art, the mixture is not accelerated abruptly in the region of the inlet funnel and/or in the region of the pre-acceleration funnel, i.e. in a very short time, to the full rotational speed of the outer screen drum, grain breakage and other damaging effects on the mixture can, for example, be avoided. In particular, mechanically very sensitive substances can thus also be processed at extremely high rotational speeds of the screen drum in the different variants of the pusher centrifuge in accordance with the invention.

Both the inlet funnel and the pre-acceleration funnel preferably extend at a substantially constant opening angle conically diverging in the direction towards the pusher base apparatus or towards the infeed device.

For specific applications, for example in dependence on the properties of the mixture to be dewatered, the inlet funnel and/or the pre-acceleration funnel can, however, also have a curved extent in a pre-settable region, with the opening angle of the inlet funnel and/or the pre-acceleration angle of the pre-acceleration funnel becoming larger or smaller in the direction towards the pusher base apparatus. This can in particular be of advantage when the inlet funnel or the pre-acceleration funnel is formed, as will be described more precisely below, as a pre-filter screen or as a pre-acceleration screen for the pre-separation of liquid phase.

In a simple embodiment of the pusher centrifuge in accordance with the invention, the inlet funnel can be drivable by the drive about the driving axis independently of the speed of rotation of the outer screen drum, whereas the pusher base apparatus can be arranged rotatably about the axis of rotation synchronously with the screen drum. The mixture distributor can include a pre-acceleration funnel for the pre-acceleration of the mixture which is preferably, but not necessarily, rotatably fixedly connected to the pusher base apparatus such that the pre-acceleration funnel rotates synchronously with the screen drum. It is understood that the pre-acceleration funnel can also be lacking in another embodiment or can likewise, like the inlet funnel, have its own drive.

For example, with a single-stage pusher centrifuge, the mixture distributor carries out the oscillatory movement for the displacement of the solid cake alone, whereas with a multi-stage pusher centrifuge, a screen stage can execute a corresponding oscillatory movement. In each case, in the operating state, there is an oscillatory relative movement between the pusher base apparatus and the screen drum immovable in the axial direction and/or between one or more possibly present further screen stages and/or the one between the pusher base apparatus and/or one or more possibly present further screen stages. The oscillatory movement of the pusher base apparatus and/or of the screen stage preferably takes place via a pusher rod, with the solid cake deposited on the screen drum being pushed out of the screen drum in a first half-period of the oscillatory movement with the outer ring region in ring sections whose width is determined by the stroke length of the oscillation movement of the pusher base apparatus and/or of the screen stage. During a second half-period of the oscillatory movement, the empty space is created in the screen drum and/or in the screen stage such that new mixture can be introduced into the empty space.

In a particularly preferred embodiment, the inlet funnel is designed as a pre-filter screen for the pre-separation of liquid phase from the mixture. Since a part of the liquid phase can already be separated from the incoming mixture in the pre-filter screen and since the mixture can be accelerated to a pre-settable rotational speed in the pre-filter screen such that the mixture introduced from the infeed device can be accelerated to a pre-settable peripheral speed before reaching the screen drum with a single-stage pusher centrifuge or before reaching the screen stage with multi-stage pusher centrifuges, the total volume of liquid phase contained in the mixture does not, on the one hand, have to be accelerated to the full peripheral speed of the screen drum, since some of the liquid phase is already separated via the pre-filter screen and can be separated directly from the screen drum or from the screen stage. Mixtures with a very high content of liquid phase, for example of more than 50% liquid phase or more than 70% liquid phase or even of more than 90% liquid phase, can thus be processed without problem. In particular, a uniform distribution of the mixture to be dried over the peripheral surface of the screen stage or of the screen drum is also ensured with an extremely high content of liquid phase. Even with very high concentrations of liquid phase in the mixture, additional devices for the pre-dewatering such as static condensers, arc screens or hydrocyclones are thus superfluous. Moreover, even very small particles contained in the mixture can be separated much more effectively from the solid cake by the effect of the pre-filtration.

In particular when, but not only when, the inlet funnel is made as a pre-filter screen for the pre-separation of liquid phase, it can be of particular advantage for the inlet funnel to have a curved extent and for the opening angle of the inlet funnel to become larger or smaller in the direction towards the pusher base apparatus. It is known that different products can have different levels of dewatering under operating conditions of the pusher centrifuge which are otherwise the same, for example in dependence on the grain size and/or on the viscosity and/or on other properties or parameters such as on the temperature of the mixture.

If, for example, a mixture is present which is relatively easy to dewater under given operating parameters, it can be of advantage for the inlet funnel or the pre-filter screen to have a curved extent, with the opening angle of the pre-filter screen becoming larger in the direction towards the pusher base apparatus. This means that the inlet funnel or the pre-filter screen diverges in the direction towards the pusher base apparatus similar to the horn of a trumpet. The output driving force at which the mixture is accelerated out of the inlet funnel thus becomes disproportionately larger as the spacing to the pusher base apparatus decreases such that the mixture which is already relatively highly dewaterable in the pre-filter screen and thus shows poor slide properties in the pre-filter screen can exit the pre-filter screen faster than, for example, with a pre-filter screen diverging in substantially cone-shape with a constant opening angle.

On the other hand, mixtures can also be present which are relatively difficult to dewater under given operating parameters. In this case, it is recommended to use an inlet funnel or a pre-filter screen with a curved extent, with the opening angle of the pre-filter screen becoming smaller in the direction towards the pusher base apparatus. This has the consequence that the output driving force with which the mixture is accelerated out of the inlet funnel increases more slowly as the spacing towards the pusher base apparatus decreases than, for example, with an inlet funnel diverging conically at a substantially constant opening angle. A certain congestion effect thereby occurs in the pre-acceleration screen such that the mixture remains longer in the pre-filter screen and is therefore already dewaterable to a higher degree in the pre-filter screen.

In a very analogous manner to the aforesaid, the pre-acceleration funnel can also have a curved extent, with the pre-acceleration angle of the pre-acceleration funnel becoming larger or smaller in the direction towards the infeed device.

The advantages previously explained in connection with the curved inlet funnel and the function thereof are easily analogously transferable to a curved pre-acceleration funnel by the person skilled in the art and therefore do not need to be repeated here.

Collection means are preferred for the collection and draining of the liquid phase separated by the pre-filter screen from the very fast rotating screen drum which can in particular be designed and arranged such that the liquid phase separated at the pre-filter screen is, where possible, not accelerated to the full peripheral speed of the outer screen drum.

The draining of the liquid phase from the collection means, which can include suitably designed and suitably arranged collection vessels and devices for the draining of the liquid, e.g. in the form of drainage pipes, can take place in different manners.

In a specific embodiment of a multi-stage pusher centrifuge, the pre-filter screen is arranged at a screen stage by means of one or more fastening stubs, with the mixture distributor including a pre-acceleration funnel which is rotatably arranged about an axis of rotation and can be driven by means of a rotational drive independently of the rotational speed of the outer screen drum. The fastening stubs are preferably made in the form of suitably shaped spokes, thin rods and/or tubes so that the solid cake can be removed without a problem from the screen stage or from the screen drum in the operating state. In particular, at least one of the fastening stubs can be made and be arranged at an outer rim of a screen stage such that the liquid phase collected in the collection means can be transported through the fastening stub into a screen opening of the screen stage and can be separated from the screen stage through the screen opening. Openings can also be provided for the draining of liquid phase at a suitable position at the fastening stub itself or also additional openings for the draining of the liquid phase can be provided at a suitable position at the screen stage.

It is also possible that in a completely analogous manner to the previously described variant the pre-filter screen is arranged by means of one or more fastening stubs at the screen drum instead of at a screen stage. This can in particular be the case in an advantageous manner with single-stage pushers. Furthermore, the pre-filter screen can also be arranged simultaneously at two or more screen stages and/or at the screen drum, with the appropriate screen stages or the screen drum not carrying out any oscillatory relative movement with respect to one another.

In another preferred embodiment, the pre-filter screen can also be designed as a two-stage screen with a coarse screen and with a fine screen. The first filter stage is formed by the coarse screen which keeps back particles contained in the mixture which are larger than the filter openings of the coarse screen. The fine screen keeps back correspondingly finer particles, whereas at least some of the liquid phase, as well as very small particles which likewise have to be removed, can be drained directly from the screen stage or from the screen drum with single-stage pusher centrifuges. The design of the pre-filter screen as a two-stage screen in particular has the advantage that the fine screen is not put under such strong mechanical strain by large and/or heavy particles contained in the incoming mixture so that the fine screen can, for example, have very small pores for the filtration of very small particles and can in particular also be made of materials which are mechanically less resistant.

In a further particularly preferred embodiment of a pusher centrifuge in accordance with the invention, the mixture distributor can include a pre-acceleration funnel which extends, for example, in a substantially conically divergent manner in the direction towards the infeed device and can specifically, for example, be rotationally fixedly connected to the pusher base apparatus. The mixture distributor includes an inlet funnel for the pre-acceleration of the mixture, with the inlet funnel being rotatably arranged about a drive axis and being rotatable about the drive axis at a pre-settable speed of rotation independently of the rotational speed of the outer screen drum. The pre-acceleration funnel can also be designed as a pre-acceleration screen, with the pre-acceleration screen extending in a substantially conically divergent manner in the direction toward the infeed device.

When the pre-acceleration funnel is designed as a pre-acceleration screen, some of the liquid phase is separable from the mixture in the pre-acceleration screen and the mixture can be accelerated to a pre-settable rotational speed in the pre-acceleration screen such that the mixture introduced by the infeed device can be accelerated to a pre-settable peripheral speed before reaching the screen drum with single-stage pusher centrifuges or before reaching the screen stage with multi-stage pusher centrifuges. On the one hand, only a smaller proportion of the total volume of liquid phase which is still contained in the mixture has to be accelerated to the full peripheral speed of the outer screen drum, since some of the liquid phase is already separated via the pre-acceleration screen and can be drained to the outside directly from the screen drum or from the screen stage. Mixtures with an extremely high content of liquid phase can thus also be processed without problem. In particular, a uniform distribution of the mixture to be dried over the peripheral surface of the screen stage or of the screen drum is also ensured with an extremely high content of liquid phase. Additional devices for the pre-dewatering such as static condensers, arc screens or hydrocyclones are superfluous even when very high concentrations of liquid phase are present in the mixture. Even very small particles contained in the mixture are also separable from the solid cake much more effectively due to the effect of a second pre-filtration.

Since the mixture, unlike with pusher centrifuges known from the prior art, is not accelerated abruptly in the region of the pre-acceleration funnel, i.e. is not accelerated to the full rotational speed of the screen drum in a very short time, grain breakage and other damaging influences on the mixture can, for example, be prevented. In particular, mechanically very sensitive materials can thus also be processed even at very high rotational speeds.

Since the pre-acceleration funnel and/or the inlet funnel have an opening angle with respect to the axis of rotation of the screen drum which is lower than 90°, the flow speed of the mixture in the pre-acceleration screen and/or in the inlet funnel is—in comparison with the speed in free-fall, i.e. without a pre-acceleration funnel and/or without an inlet funnel—directly changeable in the direction towards the peripheral surface of the screen stage or of the screen drum such that the mixture can gradually be accelerated both in the radial direction and in the peripheral direction of the screen drum with increasing approach to the outer ring region in the region of the pre-acceleration funnel and/or of the inlet funnel. This means the mixture can be accelerated gradually to a pre-settable peripheral speed in a particularly gentle manner in the region of the pre-acceleration funnel and/or of the inlet funnel to then finally achieve the full rotational speed of the outer screen drum on reaching the peripheral surface of the outer screen drum or of the screen stage.

The value of the opening angle of the inlet funnel and/or the value of the pre-acceleration angle of the pre-acceleration funnel can lie, for example, between 0° and 45° with respect to the axis of rotation, in individual cases between 0° and 10° or between 10° and 45°, in particular between 25° and 45°, preferably between 15° and 35°. It is in particular also possible for the value of the opening angle and/or of the pre-acceleration angle to be larger than 45°. It can very generally be said that as a rule a more acute angle is of advantage with respect to the axis of rotation, with an optimum value of the corresponding opening angle and/or of the pre-acceleration angle being determined, among other things, by the value of the static friction angle of the product to be dewatered.

If the pre-acceleration funnel is designed as a pre-acceleration screen, the pre-acceleration screen can also advantageously be designed as a two-stage screen with a coarse filter and a fine filter. The mixture can thereby also be filtered in two stages with the advantages already explained in detail in the region of the pre-acceleration screen, analogously to the arrangement of a two-stage screen at the inlet filter.

It must be expressly emphasized at this point that both the pre-filtering screen and the pre-acceleration screen can in particular also be made up of more than two screen stages.

In particular, in an embodiment especially important for practice, the inlet funnel and/or the pre-acceleration funnel can be designed as a skeleton-like support body which can be fitted with special filter foils for the formation of the pre-filter screen and/or of the pre-acceleration screen; i.e. the skeleton-like support body can, for example, be equipped with one or more filter screens which can possibly have differently sized filter openings for the separation in different stages.

Separator screens or, for example, sheet metal screens can be used, among other things, quite generally as filter screens. The filter screens can advantageously be provided in different manners with filter openings of different sizes. In particular, the aforesaid sheet metal screens can be stamped, drilled, lasered, electron beam punched or water jet cut, among other things, with generally other techniques also being possible. The screens themselves can, depending on the demand, be produced from different materials, in particular corrosion-resistant materials, such as plastic, composite materials or different steels such as 1.4462, 1.4539 or 2.4602 or from other suitable materials. For protection against wear, the filter screens can furthermore be provided with suitable layers, for example be hardened with hard chromium layers, tungsten carbide (WC), ceramics or in other ways. The thickness of the filter sheet metals typically amounts to 0.2 mm to 5 mm, with much different sheet metal thicknesses also being possible.

If, for example, the specific properties of the mixture to be processed require that no liquid phase should be deposited from the mixture in the pre-acceleration funnel and/or in the inlet funnel because, for example, the proportion of liquid phase is not high enough in the in-coming mixture, a pre-filtration of the mixture in the pre-acceleration funnel and/or in the inlet filter can also be omitted.

Furthermore, a collection means can also be provided at the pre-acceleration screen in order to drain off liquid phase separated at the pre-acceleration screen. The liquid phase can thus, for example, take place by a drainage opening in the pusher base apparatus into a region between a rear drum wall, which stands perpendicular to the axis of rotation, and a wall of the housing, which separates the screen drum from the drum drive. The liquid phase collected in the collection means and separated at the pre-filter screen can thus be drained in a particularly easy manner through the drainage opening in the pusher base apparatus and then through the screen opening from the screen drum.

In a specific embodiment, as already described above in further detail for the example of collection means, which can be arranged in the region of the inlet funnel, other suitable apparatuses can be provided for the draining of the liquid phase from the screen drum.

As already mentioned, the pre-acceleration funnel or the pre-acceleration screen can also be driven separately via a rotational drive. The pre-acceleration funnel is then preferably designed and arranged such that the pre-acceleration funnel can be rotated about an axis of rotation at a pre-settable speed of rotation by means of a rotational drive. The axis of rotation can, for example, be arranged inside the pusher rod concentrically to it and can be driven independently of it by the rotational drive. The pusher base apparatus is preferably fixedly connected to the outer screen drum and uncoupled from the pre-acceleration screen with respect to the rotation about the axis of rotation. This means that the pusher base apparatus rotates, for example, synchronously with the outer screen drum, whereas the pre-acceleration funnel can be driven independently of the rotational speed of the outer screen drum. It is also possible for the pusher base apparatus to rotate synchronously with the pre-acceleration funnel. This means that the pusher base apparatus and the pre-acceleration funnel can be driven jointly at a pre-settable speed of rotation and independently of the speed of rotation of the outer screen drum. Other possibilities of coupling the rotational drive and the pre-acceleration funnel and/or the pusher base apparatus are also possible, for example via suitable gear arrangements and in any other suitable manner. Suitable means can be provided for the control and/or regulation of the rotational speed of the rotational drive and thus of the pre-acceleration funnel in order to control and/or regulate the rotational drive, for example, in dependence on different operating parameters of the pusher centrifuge or in dependence on the mixture to be processed or on other factors. For this purpose, the pusher centrifuge in accordance with the invention can also include corresponding sensors for the measurement of relevant operating parameters.

It is understood that the features of the particularly preferred embodiments of the pusher centrifuge in accordance with the invention previously described by way of example can also be combined as desired in an advantageous manner, depending on the demand, and can be realized appropriately both with single-stage pusher centrifuges and with multi-stage pusher centrifuges.

The invention will be explained in the following in more detail with reference to the schematic drawing.

DESCRIPTION OF THE PREFERRED EMBODIMENTS

Figure 1:
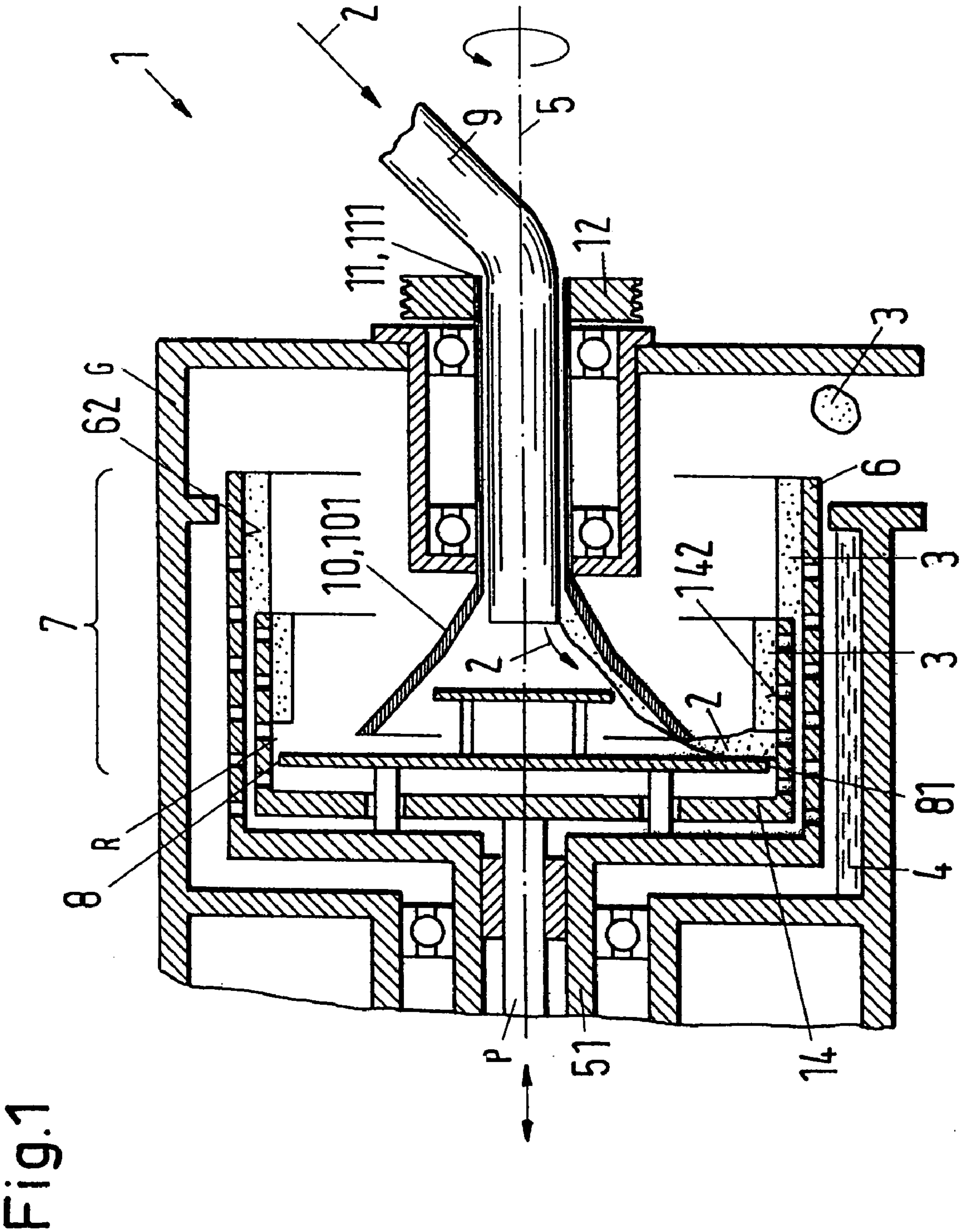
FIG. 1 shows, in section, a pusher centrifuge in accordance with the invention with a rotatable inlet funnel.

FIG. 1 shows, in section in a schematic representation, important components of a first embodiment of a pusher centrifuge in accordance with the invention which has an inlet funnel rotatably arranged about an axis of rotation as the funnel for the pre-acceleration of the mixture. A two-stage pusher centrifuge is shown schematically by way of example in FIG. 1. It is understood that the representation of FIG. 1 must be understood as an example and that the description also applies analogously to single-stage pusher centrifuges and also to pusher centrifuges with more than two stages and can be correspondingly transferred to them.

Figure 3:
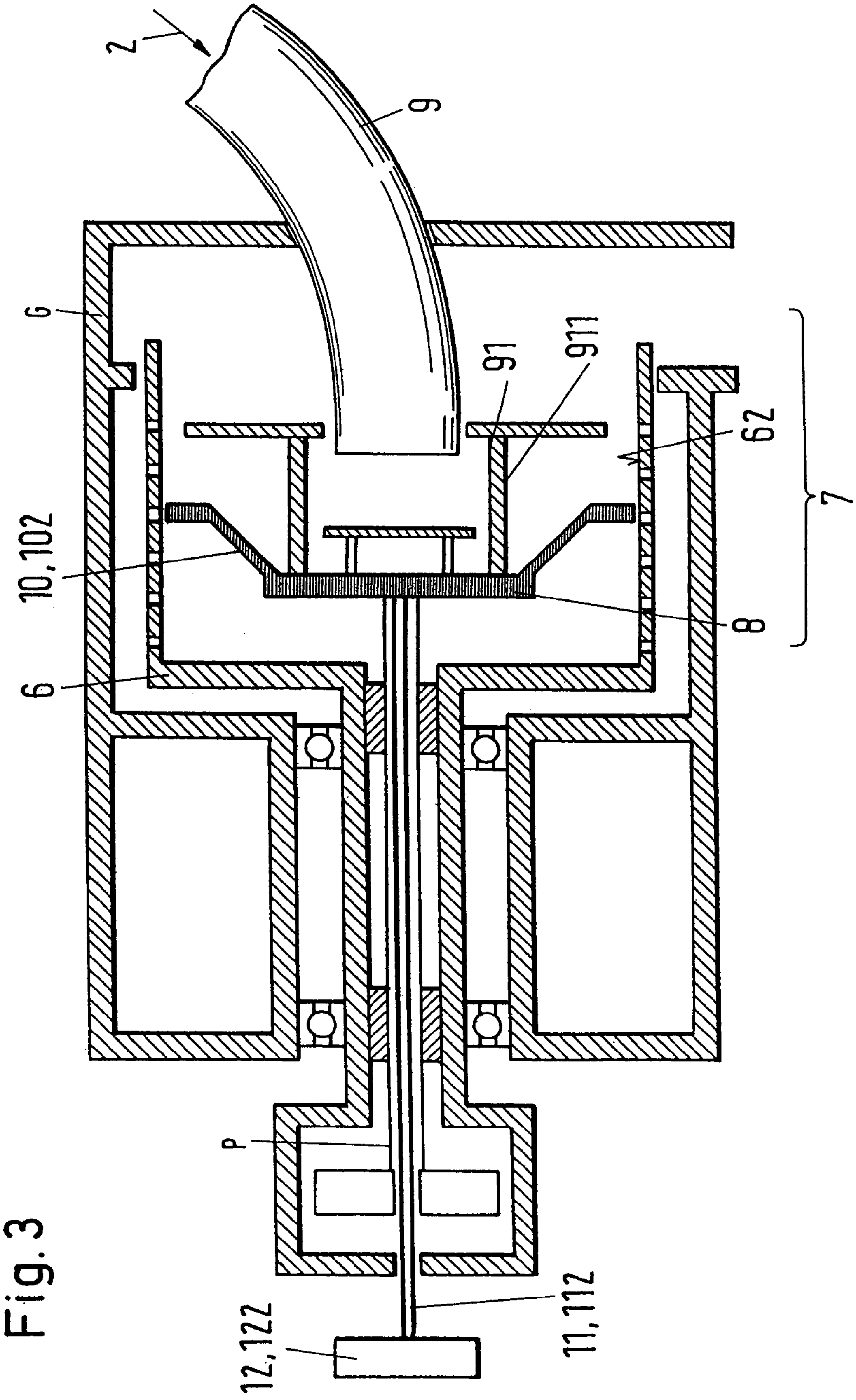
FIG. 3 shows, in section, a pusher centrifuge in accordance with the invention with a rotatable pre-acceleration funnel.

The pusher centrifuge in accordance with the invention, which will be designated as a whole in the following with the reference numeral 1, serves for the separation of a mixture 2 into a solid cake 3 and into a liquid phase 4 and includes as important components an outer screen drum 6 which is rotatable via a drum axis 51 about an axis of rotation 5 and is accommodated in a housing G. The drum axis 51 is in effective connection with a drum drive (not shown) in a manner known per se such that the screen drum 6 can be set into fast rotation about the axis of rotation 5 by the drum drive. With multi-stage centrifuges 1 such as shown by way of example in FIG. 1 with reference to a two-stage pusher centrifuge, at least one further screen stage 14 is arranged inside the outer screen drum 6. Furthermore, a mixture distributor 7 with a pusher base apparatus 8 and an infeed device 9 is provided in the screen drum 6, with either the screen stage 14 or, for example as shown in FIG. 3, the pusher base apparatus 8 being arranged movably to and fro along the axis of rotation 5 such that the solid cake 3 can be displaced by means of the pusher base apparatus 8. Both the outer screen drum 6 and, if present in multi-stage centrifuges 1, the screen stage 14 have screen openings 61, 141 through which liquid phase can be drained outwardly in a known manner by the centrifugal forces which occur at a fast rotation from the solid cake 3 or from the mixture 2 which, as will be described in more detail further below, can be applied to an inner peripheral surface 62 of the screen drum 6 with single-stage pusher centrifuges 1 in accordance with FIG. 3 or to an inner screen surface 142 of the screen stage 14 with multi-stage pusher centrifuges 1.

The mixture distributor 7 with a pusher base apparatus 8 and an infeed device 9 is arranged inside the screen drum 6 and allows mixture 2 continuously supplied by the infeed device to be distributed onto the inner peripheral surface 62 of the screen drum 6 or, with multi-stage pusher centrifuges, onto the screen stage surface 142 of the screen stage 14 by introduction into an empty space R which arises on the displacement of the solid cake 3.

The mixture 2 can be fed into the inlet funnel 101 for the pre-acceleration by means of the infeed device 9, which can, for example, include an inlet tube 9, the inlet funnel 101 extending in a substantially conically divergent manner in the direction towards the pusher base apparatus, with the inlet funnel 101 being rotatably arranged about a drive axis 11, 111 and being rotatable about the drive axis 111 at a pre-settable speed of rotation by means of a drive 12, 121. Suitable means not shown here can be provided to control and/or regulate the drive 121, for example in dependence on the mixture 2 to be processed or in dependence on suitable operating parameters of the pusher centrifuge 1.

Since the mixture 2, unlike with the pusher centrifuges known from the prior art, is not accelerated abruptly in the region of the inlet funnel 10, 101, i.e. in a very short time, to the full rotational speed of the screen drum 6, grain breakage and other damaging effects on the mixture can, for example, be avoided. In particular, mechanically very sensitive substances can thus also be processed at extremely high rotational speeds of the screen drum 6 in the pusher centrifuge 1 in accordance with the invention.

The pusher base apparatus 8 is thus formed as a ring region 81 at a peripheral region such that the solid cake 3 deposited in the screen drum 6 with single-stage pusher centrifuges 1 and in the screen stage 14 with multi-stage pusher centrifuges 1 can be displaced by an oscillation described in more detail further below along the axis of rotation 5 of the pusher base apparatus 8 and/or of the screen stage 14, out of the screen drum 6 with single-stage pusher centrifuges 1 or, with multi-stage pusher centrifuges 1, into the screen drum 6 or into a further screen stage 14 (not shown).

The pusher base apparatus 8 rotates in the embodiment shown in FIG. 1 of a pusher centrifuge 1 in accordance with the invention synchronously with the screen drum 6 about the axis of rotation 5. The oscillatory movement indicated by the double arrow in FIG. 1 is carried out in the example shown here by the screen stage 14, whereas the pusher base apparatus 8 does not oscillate. There is thus an oscillatory relative movement in the operating state between the oscillating screen stage 14 and the pusher base apparatus 8 immovable in the axial direction or the screen drum 6. The oscillatory movement is preferably generated by means of a reversible mechanism not shown here and transferred via a pusher rod P, with deposited solid cake 3 being pushed out of the screen drum 6 in ring sections whose width is determined by the stroke length of the oscillation movement in a first half-period of the oscillatory movement by the outer ring region 81 of the pusher base apparatus 8. During a second half-period of the oscillatory movement, the empty space R in the screen drum 6 arises so that new mixture 2 can be introduced into the empty space R.

Figure 2:
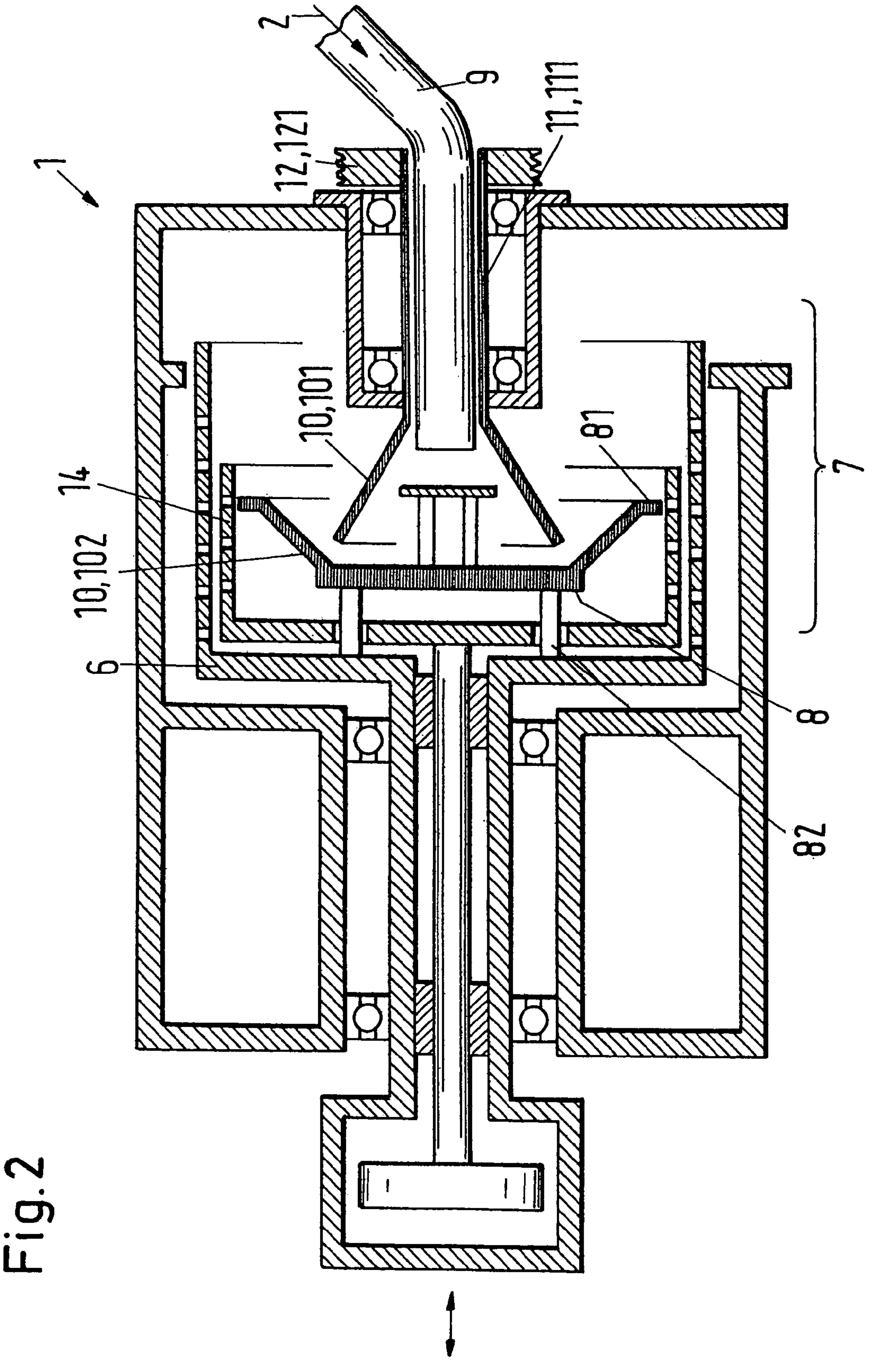
FIG. 2 shows an embodiment in accordance with FIG. 1 with a pre-acceleration funnel.

In the embodiment of a two-stage pusher centrifuge 1 shown by way of example in FIG. 2 for multi-stage pusher centrifuges 1, the pusher base apparatus 8 is rigidly coupled to the screen drum 6 by fastening means 82 and therefore rotates synchronously with the screen drum 6 and the screen stage 14 about the axis of rotation 5. The mixture distributor 7 additionally includes a pre-acceleration funnel 102 which is rotationally fixedly connected to the pusher base apparatus 8 and extends in a substantially conically divergent manner in the direction towards the infeed device 9. Since the mixture distributor 7 also includes the pre-acceleration funnel 102 in addition to the inlet funnel 101, even mechanically very sensitive mixtures 2 can be processed since the acceleration of the mixture 2 to the full peripheral speed of the outer screen drum 7 takes place in a number of stages and is thus carried out in an extremely gentle manner.

Figure 2A:
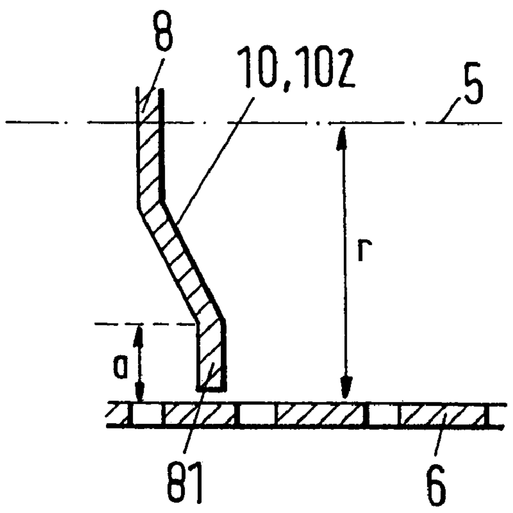
FIG. 2*a* shows an embodiment of a funnel.
Figure 2B:
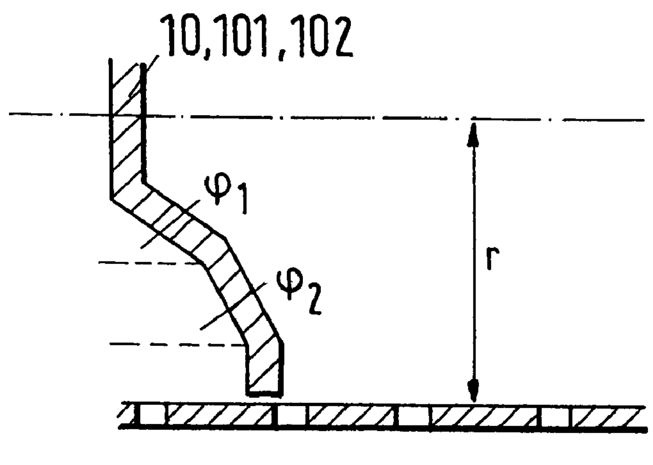
FIG. 2*b* shows a further embodiment of a funnel.

One embodiment of a funnel 10 each is shown in an exemplary and schematic manner in FIG. 2*a* and FIG. 2*b*. One pre-acceleration funnel 102 each is shown for illustration in the two figures. As, however, the reference numerals 10, 101 and 102 in FIG. 2*b* indicate, the example shown in FIG. 2*b* for the geometry of a funnel 10 relates both to the inlet funnel 101 and to the pre-acceleration funnel 102.

FIG. 2*a* shows a pre-acceleration funnel 102 with an outer ring region 81 for the displacement of a solid cake 3. The outer ring region 81 has a pre-settable height a which, in dependence on the mixture 2 to be processed and/or on the operation conditions under which the pusher centrifuge 1 in accordance with the invention is operated, amounts to approximately 1% to 40% of the drum radius r, preferably to approximately 5% to 10%, in particular to 5% to 20% of the drum radius r.

As shown schematically in FIG. 2*b*, the funnel 10 can also be made as a multi-stage funnel 10, with the funnel 10 for the pre-acceleration of the mixture 2 being able to have a plurality of part faces which can be inclined at different angles $\phi_1$, $\phi_2$ to one another, with the relative size of the part face and their inclination angles $\phi_1$, $\phi_2$ for example, being able to depend on the mixture 2 to be processed or on the operating parameters of the pusher centrifuge 1. Both the inlet funnel 101 and the pre-acceleration funnel 102 in accordance with FIG. 2*b* can be made as multi-stage funnels.

Figure 2C:
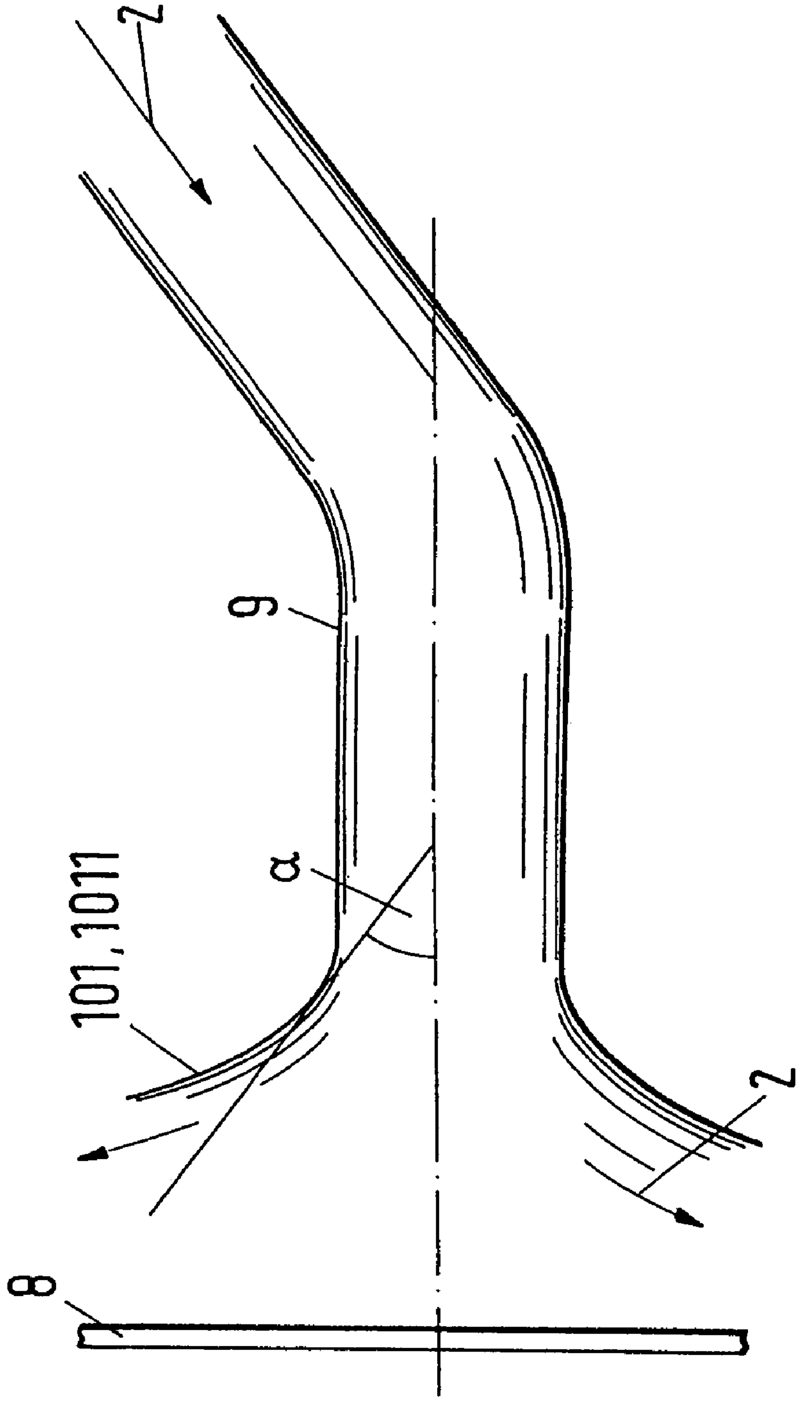
FIG. 2*c* shows a funnel with a curved extent.
Figure 2D:
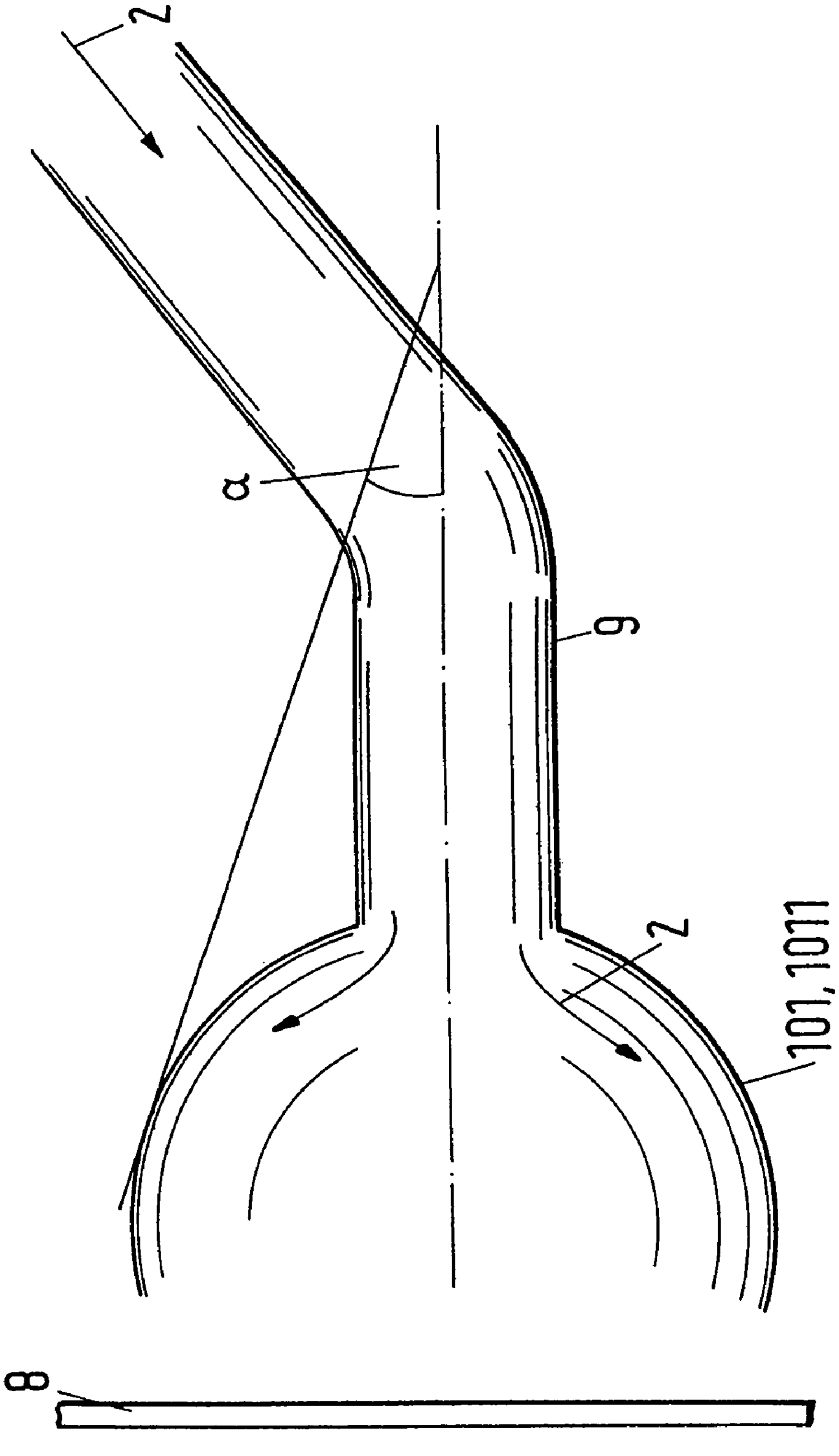
FIG. 2*d* shows another funnel in accordance with FIG. 2*c;*

In particular when, but not only when, the inlet funnel 101 is designed as a pre-filter screen 1011 for the pre-separation of liquid phase 4, it can be of particular advantage for the inlet funnel 101 to have a curved extent and for the opening angle $\alpha$ of the inlet funnel 101, as shown schematically in FIGS. 2*c* and 2*d*, to become larger or smaller in the direction towards the pusher base apparatus 8. It is known that different mixtures 2 can have different levels of dewatering under operating conditions of the pusher centrifuge 1 which are otherwise the same, for example in dependence on the grain size and/or on the viscosity and/or on other properties or parameters such as on the temperature of the mixture 2.

If, for example, a mixture 2 is present which is relatively easy to dewater under given operating parameters, it can be of advantage for the inlet funnel 101 or the pre-filter screen 1011 to have a curved extent, with the opening angle $\alpha$ of the pre-filter screen 1011 becoming larger in the direction towards the pusher base apparatus 8. Such a specific embodiment of an inlet funnel 101 is shown schematically in FIG. 2*c*. This means that the inlet funnel 101 or the pre-filter screen 1011 diverges in the direction towards the pusher base apparatus 8 similar to the horn of a trumpet. The output driving force at which the mixture 2 is accelerated out of the inlet funnel 101 thus becomes disproportionately larger as the spacing to the pusher base apparatus 8 decreases such that the mixture 2 which is already relatively highly dewaterable in the pre-filter screen 1011 and thus shows poor slide properties in the pre-filter screen 1011 can exit the pre-filter screen 1011 faster than, for example, with a pre-filter screen 1011 diverging in substantially cone-shape with a constant opening angle $\alpha$.

On the other hand, mixtures 2 can also be present which are relatively difficult to dewater under given operating parameters. In this case, it is recommended to use an inlet funnel 101 or a pre-filter screen 1011 with a curved extent, with the opening angle $\alpha$ of the pre-filter screen 1011 becoming smaller in the direction towards the pusher base apparatus 8. This has the consequence that the output driving force with which the mixture 2 is accelerated out of the inlet funnel 101 increases more slowly as the spacing towards the pusher base apparatus 8 decreases than, for example, with an inlet funnel 101 diverging conically at a substantially constant opening angle $\alpha$. A certain congestion effect thereby occurs in the pre-filter screen 1011 such that the mixture 2 remains longer in the pre-filter screen 1011 and is therefore already dewaterable to a higher degree in the pre-filter screen 1011.

In a very analogous manner to the aforesaid, the pre-acceleration funnel 102 or the pre-acceleration screen 1021 can also have a curved extent, with the pre-acceleration angle $\beta$ of the pre-acceleration funnel 102 becoming larger or smaller in the direction towards the infeed device 9.

It can be of great importance in practice to directly control the acceleration process itself or the rotational speed to which the mixture 2 can be accelerated in the pre-acceleration funnel 102. This can, for example, be achieved particularly advantageously with the further variant of a pusher centrifuge 1 in accordance with the invention shown in FIG. 3. In the variant in accordance with FIG. 3, the pre-acceleration funnel 102 is designed and arranged such that the pre-acceleration funnel 102 is rotatable at a pre-settable speed of rotation about an axis of rotation by means of a rotational drive 122 independently of the speed of rotation of the screen drum 6. The axis of rotation 112 can be arranged, as shown by way of example in FIG. 3, for example, inside the pusher rod P. Suitable means, not shown here, can be provided to control and/or regulate the drive 12, for example in dependence on the mixture 2 to be processed or in dependence on suitable operation parameters of the pusher centrifuge 1.

In the embodiment shown schematically in FIG. 3, no inlet funnel 101 is provided at the mixture distributor 7 such that the mixture 2 can be introduced directly into the pre-acceleration funnel 102 from the infeed device 9. An inlet funnel 101 can also additionally be provided in another embodiment in accordance with FIG. 3 and can, moreover, be drivable at a pre-settable speed of rotation about a drive axis 111 by means of a separate drive 121. Moreover, a splash protection 91, which can be fastened to the pusher base apparatus 8 on stubs 911 and into which the infeed device 9 opens, can also be omitted.

Preferably, but not necessarily, the pre-acceleration funnel 102 can, for example, rotate at a different rotational speed in a direction of the oscillation movement than with the opposite oscillation movement. The rotational frequency can thus, for example, be chosen on the displacement of the solid cake 3 such that the pre-acceleration funnel 102 rotates synchronously with the outer screen drum 6 so that no relative movement is present with respect to the rotation about the axis of rotation 5 on the displacement between the outer ring region 81 and the solid cake 3 which is deposited on the peripheral surface 62 of the screen drum 6, whereas on the return movement, that is, in the phase of the oscillation movement in which the empty space R is loaded with new mixture 2, the pre-acceleration funnel 102 rotates more slowly, for example, than the outer screen drum 6. In another respect, the pusher centrifuge 1 shown in FIG. 3 can also be designed as a multi-stage pusher centrifuge 1 and also be operated analogously, as will be described in more detail further below, as a multi-stage pusher centrifuge.

Figure 3A:
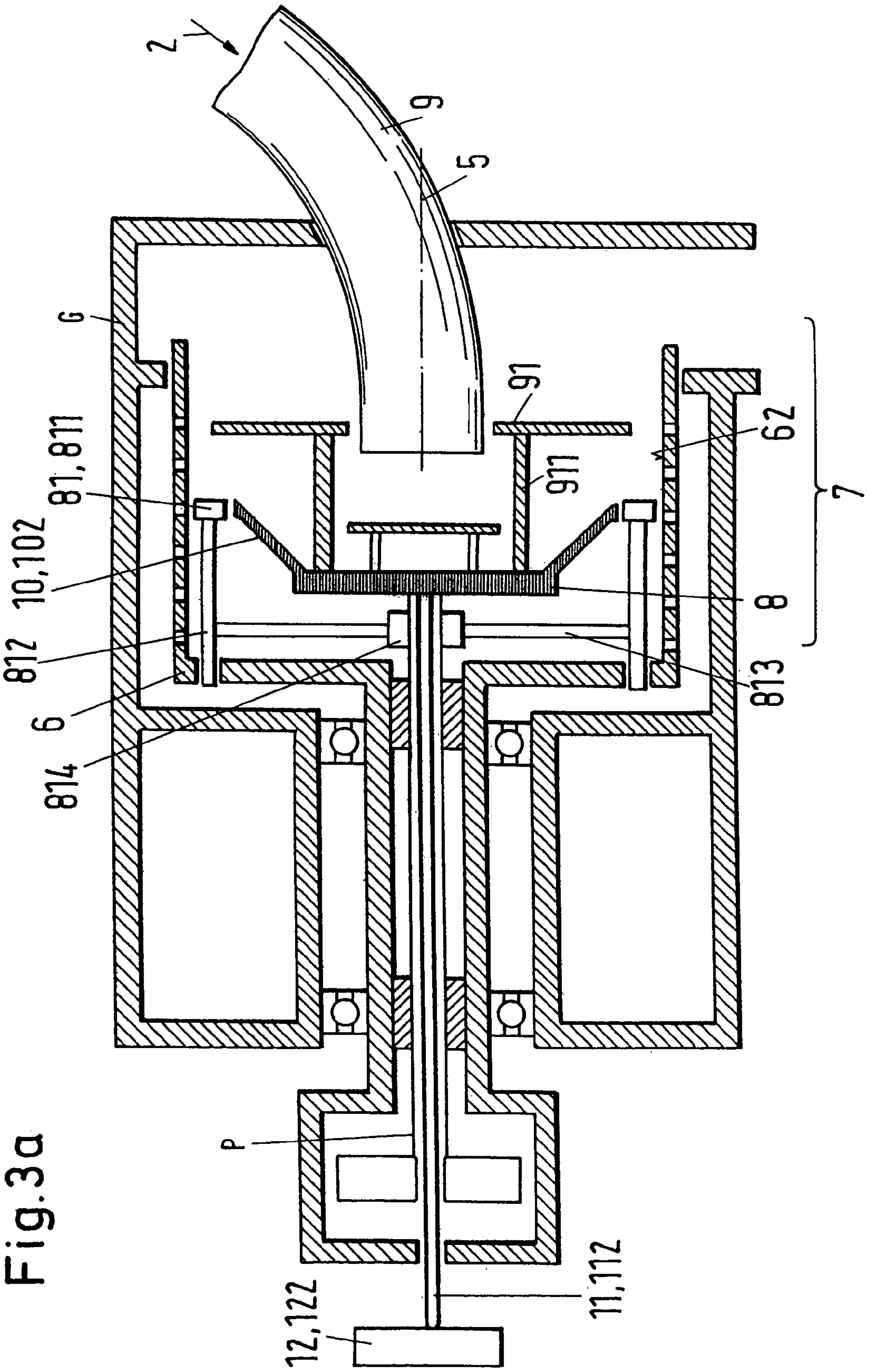
FIG. 3*a* shows a further embodiment in accordance with FIG. 3 with a false bottom.

FIG. 3*a* shows a further embodiment in accordance with FIG. 3 with a ring region 81 which is formed as a false bottom 811 and oscillates with the pre-acceleration funnel 102 and rotates at the same speed of rotation as the outer screen drum 6 which, in the present embodiment shown, is generally different from the speed of rotation of the pre-acceleration funnel 102. For this purpose, as shown schematically in FIG. 3*a*, the false bottom 811 can be rotationally fixedly connected via at least one fastening strut 812 to the outer screen drum 6, with the fastening strut 812 being freely movable in the direction of the axis of rotation with respect to the non-oscillating screen drum 6; that is, the fastening strut 812 is uncoupled from the outer screen drum 6 with respect to the oscillation movement. To ensure that the false bottom 811 can oscillate synchronously with the pre-acceleration funnel 102, with the false bottom 811, however, simultaneously having to be uncoupled from the rotational movement of the pre-acceleration funnel 102, the fastening strut 812 is coupled by means of a uncoupling socket 814 in a fixed pushing manner to the pusher rod P via a pusher element 813 which can, for example, surround the axis of rotation 5 in a ring-shaped manner or can also be made as a simple support strut 813. The uncoupling socket 814 for the uncoupling of the rotational movement of the pusher element 813 from the rotational movement of the pre-acceleration funnel 102 can, for example, include a ball bearing mechanism or be designed and arranged in another manner suitable for the uncoupling of the relative rotational movements. In particular, the uncoupling mechanism 814 can also be designed as a uncoupling element 814 not shown in FIG. 3*a* which can be suitably arranged and designed, for example, between the pusher rod P and the pusher base apparatus 8.

The advantages of the variant in accordance with FIG. 3*a* are obvious. On the one hand, the pre-acceleration funnel 102 can be driven completely independently of the speed of rotation of the outer screen drum 6 at a rotational frequency which can be matched to the mixture 2 to be processed and, on the other hand, the false bottom 811 which transports the solid cake 3 in the axial direction rotates at the same speed of rotation as the screen drum 6 such that no relative movement takes place with respect to the rotation about the axis of rotation 5 between the false bottom 811 and the screen drum 6. The rotational speed can also be variable in this case, for example in dependence on an instantaneous operating state of the pusher centrifuge 1, as already described.

Figure 4:
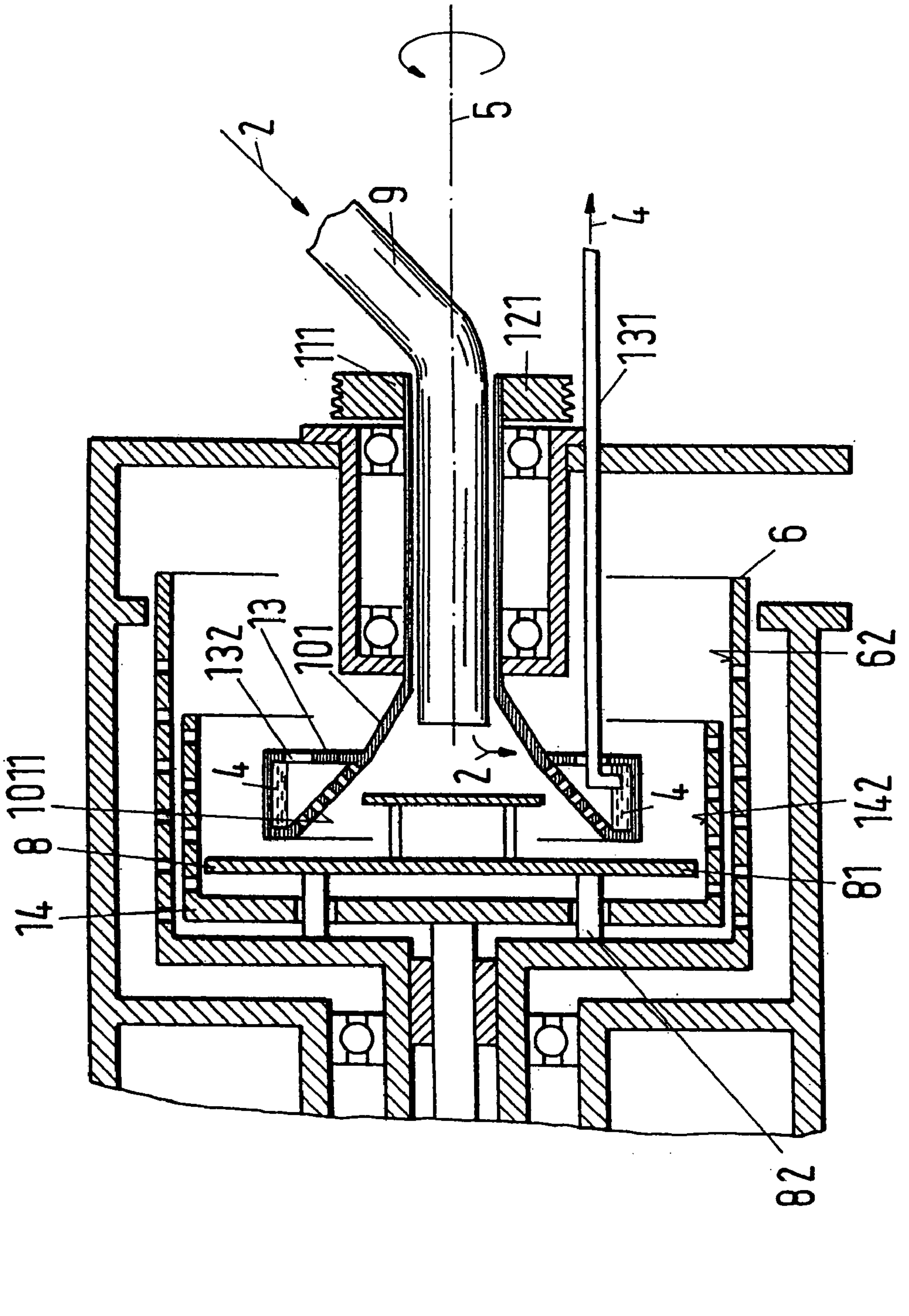
FIG. 4 shows a further embodiment in accordance with FIG. 1 with a pre-filter screen.

FIG. 4 shows a further embodiment of a pusher centrifuge 1 in accordance with the invention in which the inlet funnel 101 is made as a pre-filter screen 1011 for the pre-separation of liquid phase 4 from the mixture 2 and can be driven at a pre-settable speed about the drive axis 111 by means of the drive 121. A substantial advantage of this variant consists of the fact that some of the liquid phase 4 can already be separated from the mixture 2 in the pre-filter screen 1011 and the mixture 2 can be pre-accelerated in the pre-filter screen 1011 to a pre-settable rotational speed such that the mixture 2 introduced from the infeed device 9 can be accelerated to a pre-settable peripheral speed before reaching the screen drum 6 with single-stage pusher centrifuges 1 or before reaching the screen stage 14 with multi-stage pusher centrifuges 1. The whole volume of liquid phase 4 which is contained in the mixture 2 thereby does not have to be accelerated to the full peripheral speed of the screen drum 6 since some of the liquid phase 4 is already separated via the pre-filter screen 1011 and can be separated from the screen drum 6 or from the screen stage 14. Mixtures 2 with a very high content of liquid phase 4 can thus be processed without problem. In particular, a uniform distribution of the mixture 2 to be dried over the peripheral surface 142 of the screen stage 14 or over the peripheral surface 62 of the screen drum 6 is thus also ensured with a high content of liquid phase 4. Even with very high concentrations of liquid phase 4 in the mixture 2, additional devices for the pre-dewatering such as static condensers, arc screens or hydrocyclones are thus superfluous. Even very small particles contained in the mixture 2 can be separated much more effectively from the solid cake 3 by the effect of the pre-filtration.

Collections means 13 are preferably provided, as shown by way of example in FIG. 4, for the collection and draining of the liquid phase 4 from the pre-filter screen 1011.

The draining of the liquid phase 4 which was separated into the collection means 13 at the pre-filter screen 1011 preferably takes place via a lead device 131 which can e.g. include a suitably designed tubular lead 131 suitably arranged in the pusher centrifuge 1. For the leadthrough of the lead device 131 into the interior space of the collection means 13, the collection means 13 has a circular disk-shaped opening groove 132 which extends over a side facing the infeed device 9 such that the rotational movement of the pre-filter screen 1011 through the lead device 131 is not impeded.

The pre-filter screen 1011 can also be designed as a two-stage screen with a coarse screen and a fine screen. The first filter stage is formed by the coarse screen which holds back particles contained in the mixture 2 which are larger than the filter openings of the coarse screen. The fine screen holds back correspondingly finer particles, whereas at least some of the liquid phase 4 as well as very fine particles which likewise have to be removed can be drained directly from the screen stage 14 or from the screen drum 6 with single-stage pusher centrifuges 1. The design of the pre-filter screen 1011 as a two-stage screen in particular has the advantage that the fine screen is not put under such strong mechanical strain by large and/or heavy particles which can be contained in the incoming mixture 2 so that the fine screen can, for example, have very small pores for the filtering of very small particles and can in particular also be made from mechanically less resistant materials.

Figure 5:
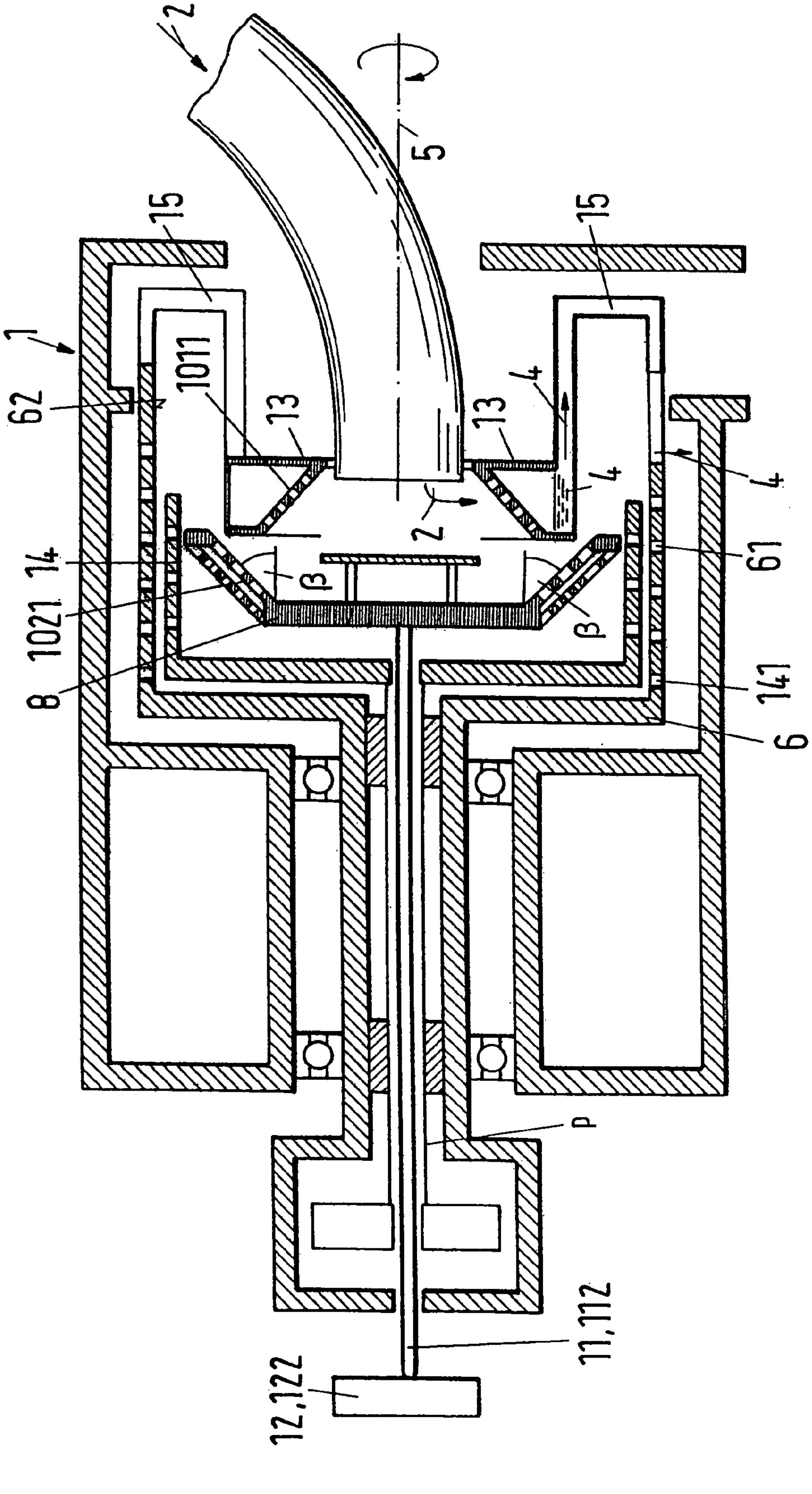
FIG. 5 shows an embodiment in accordance with FIG. 3 with a pre-filter screen and a pre-acceleration screen.

In FIG. 5, an embodiment of a pusher centrifuge 1 in accordance with the invention is shown in which the separately drivable pre-acceleration funnel 102 is designed as a pre-acceleration screen 1021 for the pre-separation of liquid phase 4 from the mixture 2. In particular, the pre-acceleration screen 1021 is here designed as a two-stage screen with a coarse screen and a fine screen, which brings about the advantages already described in detail above for the example of the pre-filter screen 1011. The pre-acceleration screen 1021 does not have to be designed as a two-stage screen.

The pre-acceleration funnel 102 or the pre-acceleration screen 1021 has a pre-acceleration angle β with respect to the axis of rotation 5 which lies, for example with respect to the axis of rotation 5 between 0° and 45°, individually between 0° and 10° or between 10° and 45°, in particular between 25° and 45°, preferably between 15° and 35°. It is specifically also possible for the value of the opening angle α and/or of the pre-acceleration angle β to be larger than 45°. The flow speed of the mixture 2 in the pre-acceleration screen 1021 is thereby directly changeable in comparison with the speed in free-fall in the direction towards the peripheral surface 142 of the screen stage 14 such that the mixture 2 can be gradually accelerated both in the radial direction and in the peripheral direction of the screen drum 6 in the region of the pre-acceleration funnel 102 or of the pre-acceleration screen 1021 with an increasing approximation to the outer ring region 81. This means that the mixture 2 can be accelerated gradually in a particularly gentle manner in the region of the pre-acceleration screen 1021 to a pre-settable peripheral speed in order to then finally reach the full rotational speed of the screen drum 6 on reaching the peripheral surface 62 or the peripheral surface 142 of the screen stage 14.

In the embodiment shown in FIG. 5 of a multi-stage pusher centrifuge 1, the inlet funnel 101 is designed as a pre-filter screen 1011 and is arranged at the screen drum 6 by means of one or more fastening stubs 15. The fastening stubs 15 are preferably made in the form of suitably shaped spokes 15, thin rods 15 or tubes 15 so that the solid cake 3 can be removed without a problem from the screen stage 14 or from the screen drum 6 in the operating state. At least one of the fastening stubs 15 is made and arranged at an outer rim of the screen drum 6 such that the liquid phase 4 collected in the collection means 13 can be transported through the fastening stub 15 into a screen opening 61 of the screen drum 6 and can be separated from the screen drum 6 through the screen opening 61. Openings can also be provided for the draining of liquid phase 4 at a suitable position at the fastening stub 15 itself.

Depending on the embodiment of the pusher centrifuge 1 in accordance with the invention or depending on the demand, the pre-filter screen 1011 can also be arranged by means of one or more fastening stubs 15 to a screen stage 14 or even be arranged at a plurality of screen stages 14 or at a screen stage 14 and at the screen drum 6, with the corresponding drums preferably not carrying out an oscillatory relative movement with respect to one another.

Preferably, but not necessarily, the pre-acceleration funnel 102 or the pre-acceleration funnel 1021 can, for example, rotate at a different rotational speed in a direction of the oscillation movement of the screen stage 14 than with the opposite oscillation movement of the screen stage 14. The rotational frequency of the pre-acceleration funnel 102 can thus, for example, be chosen on the displacement of the solid cake 3 such that the pre-acceleration funnel 102 rotates synchronously with the screen stage 14 so that no relative movement is present with respect to the rotation about the axis of rotation 5 on the displacement between the outer ring region 81 and the solid cake 3 which is deposited on the peripheral surface of the screen stage 14, whereas on the return movement, that is, in the phase of the oscillation movement in which the empty space R is loaded with new mixture 2, the pre-acceleration funnel 102 rotates more slowly, for example, than the screen stage 14.

Figure 5A:
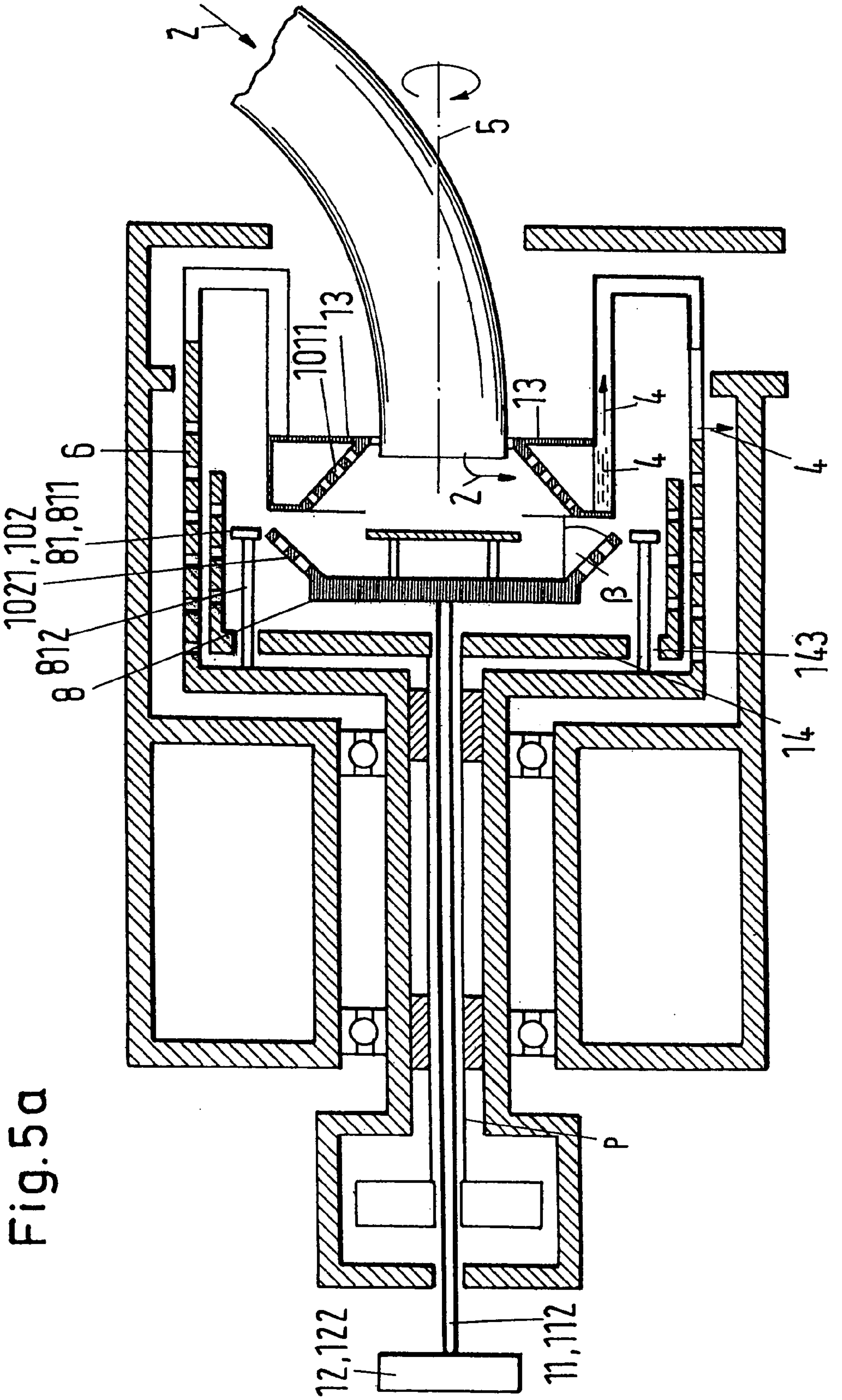
FIG. 5*a* shows an embodiment in accordance with FIG. 5 with a false bottom.

Finally, in FIG. 5*a*, an embodiment in accordance with FIG. 5 is shown schematically with a false bottom 811, with the pre-acceleration screen 1021 not being shown as a two-stage screen for reasons of clarity. Both the pre-acceleration screen 1021 and the pre-filter screen 1011 can also be made as a single-stage, two-stage or multi-stage screen.

The embodiment in accordance with FIG. 5*a* has an outer ring region 81 designed as a false bottom 811 which rotates synchronously with the outer screen drum 6, but is uncoupled from the pre-acceleration funnel 102 with respect to the rotational movement such that the pre-acceleration funnel 102 or the pre-acceleration screen 1021 is rotatable about the axis of rotation 5 at a different speed to the false bottom 811. For this purpose, as shown schematically in FIG. 5*a*, the false bottom 811 can be rotationally fixedly connected to the outer screen drum 6 via at least one fastening strut 812, with the fastening strut 812 being guided through a suitably placed opening 143 in the screen stage 14 such that the fastening strut 812 is uncoupled from the oscillation movement of the screen stage 14. The embodiment in accordance with FIG. 5*a* can also be transferred analogously to pusher centrifuges 1 with more stages than two-stage pusher centrifuges 1.

The advantages of the variant in accordance with FIG. 5*a* are obvious. On the one hand, the pre-acceleration funnel 102 can be driven completely independently of the speed of rotation of the outer screen drum 6 at a rotational frequency which can be matched to the mixture 2 to be processed and, on the other hand, the false bottom 811 which transports the solid cake 3 in the axial direction rotates at the same speed of rotation as the screen drum 6 or as the screen stage 14 such that no relative movement takes place with respect to the rotation about the axis of rotation 5 between the false bottom 811 and the screen stage 14. The rotational speed can also be variable in this case, for example in dependence on an instantaneous operating state of the pusher centrifuge 1, as already described above.

It is self-explanatory that the previously explained variants shown schematically in the figures can also be combined as desired with one another to form further embodiments to satisfy specific demands in practice.

By the use of the pusher centrifuge in accordance with the invention which can be designed with one or more stages, the mixture introduced in the inlet funnel and/or in the pre-acceleration funnel can be pre-accelerated to a presettable peripheral speed such that the mixture is not accelerated to the full peripheral speed of the screen drum from a peripheral speed close to zero in a very short time on impacting the screen drum or the screen stage. Grain breakage can, among other things, thereby be avoided such that in particular also substances which are particularly sensitive to abrupt changes of a centrifugal acceleration or a radial acceleration are processed while observing very high quality demands.

Since both the inlet funnel and the pre-acceleration funnel can be designed as screens for the pre-separation of liquid phase, in particular also much lower inlet concentrations can moreover be processed which correspond, for example, to a 50% or 70% or 80% or even more than a 90% proportion of liquid phase, since a substantial part of the liquid phase contained in the mixture can already be separated in the pre-filter screen and/or in the pre-acceleration screen. It is in particular possible by the combined use of the pre-filter screen and of the pre-acceleration screen to process mixtures with almost any desired large liquid content without the liquid having to be pre-condensed in complex methods. It is thus also always ensured with an extremely high liquid content that a uniform distribution of the mixture to be dried takes place over the inner peripheral surface of the inner screen stage or of the outer screen drum. Very damaging vibrations of the screen drum and thus the premature wear of bearings and drive are thus prevented and safety problems in operation are effectively prevented. Furthermore, problems in the washing of the solid cake due to its uneven distribution over the peripheral surface of the screen drum are very largely avoided. The use of pre-dewatering systems which are very complex both in a technical process aspect and in an apparatus aspect is likewise avoided, which results in substantial cost savings in operation.

When the previously mentioned filter systems are used, the whole volume of liquid phase which is supplied with mixture also no longer has to be accelerated to the full peripheral speed of the screen drum. This is in particular extremely favorable with respect to the energy consumption of the pusher centrifuge in accordance with the invention and moreover influences the operating behavior of the centrifuge overall in a very positive manner.

By corresponding different designs of the different filter surfaces and in particular by the use of the pre-acceleration funnel and/or of the inlet funnel with a separate drive, it is possible even to process very sensitive mixtures even at high speeds of rotation of the screen drum while maintaining very high quality standards.

The invention claimed is:

1. A pusher centrifuge for the separation of a mixture into a solid cake and into a liquid phase, including an outer screen drum rotatable about an axis of rotation, a mixture distributor arranged in the screen drum with a pusher base apparatus and an infeed device, with the pusher base apparatus being arranged and designed such that the solid cake is displaceable by means of the pusher base apparatus and the mixture can be introduced by the infeed device via the mixture distributor into an empty space which arises on the displacement of the solid cake by the pusher base apparatus, with the mixture distributor including at least one funnel for the pre-acceleration of the mixture, wherein the funnel is rotatably arranged about a drive axis and is rotatable at a pre-settable speed of rotation about the drive axis by means of a drive, and wherein the mixture distributor includes an inlet funnel which has a curved extent and an opening angle which becomes one of larger and smaller in the direction towards the pusher base apparatus.

2. A pusher centrifuge in accordance with claim 1, wherein the inlet funnel for the pre-acceleration of the mixture extends at a substantially constant opening angle in the direction towards the pusher base apparatus.

3. A pusher centrifuge in accordance with claim 1, wherein the inlet funnel is rotatably arranged about a drive axis and is rotatable at a pre-settable speed of rotation about the drive axis by means of a drive.

4. A pusher centrifuge in accordance with claim 1, wherein the mixture distributor includes an inlet funnel made as a pre-filter screen, the pre-filter screen being arranged at a screen stage and/or at the screen drum.

5. A pusher centrifuge in accordance with claim 1, wherein the mixture distributor includes a pre-acceleration funnel which is designed and arranged such that the pre-acceleration funnel is rotatable at a pre-settable speed of rotation about an axis of rotation by means of a rotational drive.

6. A pusher centrifuge in accordance with claim 5, wherein the inlet funnel is made as a pre-filter screen for the pre-separation of liquid phase from the mixture.

7. A pusher centrifuge in accordance with claim 5, wherein the pre-acceleration funnel is designed as a pre-acceleration screen for the pre-separation of liquid phase from the mixture.

8. A pusher centrifuge in accordance with claim 1, wherein the mixture distributor includes an inlet funnel made as a pre-filter screen, and wherein the pre-acceleration funnel comprises a pre-acceleration screen, at least one of the pre-filter screen and the pre-acceleration screen comprising a two-stage screen with a coarse screen and a fine screen.

9. A pusher centrifuge in accordance with claim 8, wherein collection means are provided for the collection and draining of the liquid phase from at least one of the pre-filter screen and the pre-acceleration screen.

10. A pusher centrifuge for the separation of a mixture into a solid cake and into a liquid phase, including an outer screen drum rotatable about an axis of rotation, a mixture distributor arranged in the screen drum with a pusher base apparatus and an infeed device, with the pusher base apparatus being arranged and designed such that the solid cake is displaceable by means of the pusher base apparatus and the mixture can be introduced by the infeed device via the mixture distributor into an empty space which arises on the displacement of the solid cake by the pusher base apparatus, with the mixture distributor including at least one funnel for the pre-acceleration of the mixture, wherein the funnel is rotatably arranged about a drive axis and is rotatable at a pre-settable speed of rotation about the drive axis by means of a drive, and wherein the mixture distributor includes a pre-acceleration funnel which extends at a substantially constant pre-acceleration angle in a conically divergent manner in the direction towards the infeed device.

11. A pusher centrifuge in accordance with claim 10, wherein the inlet funnel has a curved extent and the opening angle of the inlet funnel becomes larger in the direction towards the pusher base apparatus.

12. A pusher centrifuge in accordance with claim 10, wherein the inlet funnel has a curved extent and the opening angle of the inlet funnel becomes smaller in the direction towards the pusher base apparatus.

13. A pusher centrifuge for the separation of a mixture into a solid cake and into a liquid phase, including an outer screen drum rotatable about an axis of rotation, a mixture distributor arranged in the screen drum with a pusher base apparatus and an infeed device, with the pusher base apparatus being arranged and designed such that the solid cake is displaceable by means of the pusher base apparatus and the mixture can be introduced by the infeed device via the mixture distributor into an empty space which arises on the displacement of the solid cake by the pusher base apparatus, with the mixture distributor including at least one funnel for the pre-acceleration of the mixture, wherein the funnel is rotatably arranged about a drive axis and is rotatable at a pre-settable speed of rotation about the drive axis by means of a drive, and wherein the mixture distributor includes a pre-acceleration funnel which has a curved extent and a pre-acceleration angle which becomes one of larger and smaller in the direction towards the infeed device.

14. A pusher centrifuge for the separation of a mixture into a solid cake and into a liquid phase, including an outer screen drum rotatable about an axis of rotation, a mixture distributor arranged in the screen drum with a pusher base apparatus and an infeed device, with the pusher base apparatus being arranged and designed such that the solid cake is displaceable by means of the pusher base apparatus and the mixture can be introduced by the infeed device via the mixture distributor into an empty space which arises on the displacement of the solid cake by the pusher base apparatus, with the mixture distributor including at least one funnel for the pre-acceleration of the mixture, wherein the funnel is rotatably arranged about a drive axis and is rotatable at a pre-settable speed of rotation about the drive axis by means of a drive, and wherein the mixture distributor includes a pre-acceleration funnel designed and arranged such that the pre-acceleration funnel is rotatable at a pre-settable speed of rotation about an axis of rotation by means of a rotational drive.

15. A pusher centrifuge for the separation of a mixture into a solid cake and into a liquid phase, including an outer screen drum rotatable about an axis of rotation, a mixture distributor arranged in the screen drum with a pusher base apparatus and an infeed device, with the pusher base apparatus being arranged and designed such that the solid cake is displaceable by means of the pusher base apparatus and the mixture can be introduced by the infeed device via the mixture distributor into an empty space which arises on the displacement of the solid cake by the pusher base apparatus, with the mixture distributor including at least one funnel for the pre-acceleration of the mixture, wherein the funnel is rotatably arranged about a drive axis and is rotatable at a pre-settable speed of rotation about the drive axis by means of a drive, and wherein the mixture distributor includes an inlet funnel made as a pre-filter screen for the pre-separation of liquid phase from the mixture.

16. A pusher centrifuge in accordance with claim 15, wherein the mixture distributor includes a pre-acceleration funnel which extends at a substantially constant pre-acceleration angle in a conically divergent manner in the direction towards the infeed device.

17. A pusher centrifuge in accordance with claim 16, wherein the pre-acceleration funnel has a curved extent and the pre-acceleration angle of the pre-acceleration funnel becomes larger in the direction towards the infeed device.

18. A pusher centrifuge in accordance with claim 16, wherein the pre-acceleration funnel has a curved extent and the pre-acceleration angle of the pre-acceleration funnel becomes smaller in the direction towards the infeed device.

19. A pusher centrifuge for the separation of a mixture into a solid cake and into a liquid phase, including an outer screen drum rotatable about an axis of rotation, a mixture distributor arranged in the screen drum with a pusher base apparatus and an infeed device, with the pusher base apparatus being arranged and designed such that the solid cake is displaceable by means of the pusher base apparatus and the mixture can be introduced by the infeed device via the mixture distributor into an empty space which arises on the displacement of the solid cake by the pusher base apparatus, with the mixture distributor including at least one funnel for the pre-acceleration of the mixture, wherein the funnel is rotatably arranged about a drive axis and is rotatable at a pre-settable speed of rotation about the drive axis by means of a drive, wherein the mixture distributor includes an inlet funnel made as a pre-filter screen, wherein the pre-acceleration funnel comprises a pre-acceleration screen, and wherein at least one of the pre-filter screen and the pre-acceleration screen comprises a two-stage screen with a coarse screen and a fine screen.

* * * * *